US012804235B2

(12) United States Patent
Neiva de Medeiros

(10) Patent No.: US 12,804,235 B2
(45) Date of Patent: Nov. 17, 2026

(54) SYSTEM AND METHOD FOR MICROPAYMENT ADVERTISEMENT SUPPRESSION

(71) Applicant: Gustavo Neiva de Medeiros, New York, NY (US)

(72) Inventor: Gustavo Neiva de Medeiros, New York, NY (US)

( * ) Notice: Subject to any disclaimer, the term of this patent is extended or adjusted under 35 U.S.C. 154(b) by 0 days.

(21) Appl. No.: 19/004,263

(22) Filed: Dec. 28, 2024

(65) Prior Publication Data

US 2025/0274639 A1 Aug. 28, 2025

Related U.S. Application Data

(60) Provisional application No. 63/556,610, filed on Feb. 22, 2024.

(51) Int. Cl.

| | |
|---|---|
| ***H04N 21/478*** | (2011.01) |
| ***G06Q 30/0273*** | (2023.01) |
| ***H04N 21/2187*** | (2011.01) |
| ***H04N 21/234*** | (2011.01) |
| ***H04N 21/81*** | (2011.01) |

(52) U.S. Cl.

CPC ....... *H04N 21/478* (2013.01); *G06Q 30/0275* (2013.01); *H04N 21/2187* (2013.01); *H04N 21/23418* (2013.01); *H04N 21/812* (2013.01); *H04N 21/8133* (2013.01)

(58) Field of Classification Search

None

See application file for complete search history.

(56) References Cited

U.S. PATENT DOCUMENTS

| | | | |
|---|---|---|---|
| 7,631,331 | B2 | 12/2009 | Sie |
| 8,645,989 | B2 | 2/2014 | Barton |
| 10,284,921 | B2 | 5/2019 | Bhogal |

(Continued)

FOREIGN PATENT DOCUMENTS

| | | |
|---|---|---|
| WO | 2009088586 A2 | 7/2009 |

OTHER PUBLICATIONS

International Preliminary Report on Patentability Issued in International Patent Application No. PCT/US2025/016266, dated Aug. 25, 2026, 1 page.

(Continued)

*Primary Examiner* — Junior O Mendoza

(74) *Attorney, Agent, or Firm* — Pillsbury Winthrop Shaw Pittman, LLP

(57) ABSTRACT

A system and method for selectively suppressing advertisements in media content via a micropayment mechanism. A media content server distributes a video stream with designated ad spaces to a viewer's device, while an advertisement decision service receives bids to fill those spaces. An advertisement skip service presents the viewer with an option to pay a predetermined fee to bypass the ad, processes the payment, and suppresses the scheduled advertisement. To maintain a seamless viewing experience, a secondary content generator inserts contextually relevant or AI-generated content in place of the advertisement. This approach preserves advertising revenue models, introduces a new monetization stream from viewers, and provides uninterrupted media playback tailored to user preferences.

17 Claims, 5 Drawing Sheets

(56) References Cited

U.S. PATENT DOCUMENTS

| | | | | |
|---|---|---|---|---|
| 12,495,184 | B1 * | 12/2025 | Kresh | H04N 21/4542 |
| 2002/0144262 | A1 | 10/2002 | Plotnick | |
| 2005/0071886 | A1 | 3/2005 | Deshpande | |
| 2005/0262539 | A1 | 11/2005 | Barton | |
| 2007/0130005 | A1 * | 6/2007 | Jaschke | G06Q 30/0269 705/14.66 |
| 2008/0040740 | A1 | 2/2008 | Plotnick | |
| 2008/0109840 | A1 * | 5/2008 | Walter | H04N 21/6125 348/E7.071 |
| 2008/0155585 | A1 | 6/2008 | Craner | |
| 2009/0030802 | A1 | 1/2009 | Plotnick | |
| 2009/0222850 | A1 | 9/2009 | Darnell | |
| 2013/0029762 | A1 * | 1/2013 | Klappert | A63F 13/792 463/31 |
| 2013/0198013 | A1 | 8/2013 | Shehan et al. | |
| 2016/0189226 | A1 | 6/2016 | Rao | |
| 2017/0060405 | A1 | 3/2017 | Voss et al. | |
| 2017/0195743 | A1 * | 7/2017 | Wood | H04N 7/17318 |
| 2019/0007713 | A1 | 1/2019 | Venkatraman et al. | |
| 2021/0065289 | A1 | 3/2021 | Semret | |

OTHER PUBLICATIONS

International Search Report and Written Opinion Issued in International Patent Application No. PCT/US2025/016266, mailed May 2, 2025.

* cited by examiner

SYSTEM AND METHOD FOR MICROPAYMENT ADVERTISEMENT SUPPRESSION

FIELD

The present invention relates to alternative advertising in media, and more particularly to a system and method for micropayment advertisement suppression.

BACKGROUND

Traditional television broadcasting involves scheduled commercial breaks where all viewers are shown the same advertisements. This one-size-fits-all approach does not consider individual viewer preferences or interests, leading to a potentially less engaging experience for the audience. As a result, several television ad-skipping services have emerged over the years, providing viewers with the option to avoid commercials during their viewing experience. These services typically function with DVR (Digital Video Recorder) systems or through specific streaming platforms. Some notable examples include:

A. TiVo: One of the most well-known DVR providers, TiVo offers features that allow users to skip ads on recorded programs. The TiVo Roamio and TiVo Bolt series, for instance, have a feature called SkipMode, which lets users skip entire commercial breaks in recorded shows with a single button press.

B. Dish Network's Hopper: The Hopper DVR from Dish Network comes with an AutoHop feature. This allows viewers to skip commercials on recorded primetime content from certain major networks, though there are some restrictions on how and when the feature can be used.

C. YouTube Premium: While primarily a streaming service, YouTube Premium (formerly YouTube Red) provides an ad-free experience across all content on YouTube, including TV shows and movies, for a monthly subscription fee.

D. Hulu (No Ads): Hulu offers an ad-free version of its streaming service for a higher subscription price. This allows viewers to watch most of its content, including TV shows and movies, without interruptions from commercials.

E. Plex: Plex offers DVR services that allow users to record free over-the-air television and then watch these recordings with the option to skip ads.

F. Netflix: Although not a traditional ad-skipping service, Netflix's subscription model offers ad-free viewing of its entire content library, including TV shows, movies, and documentaries.

G. Amazon Prime Video: Similar to Netflix, Amazon Prime Video offers an ad-free viewing experience for its library of TV shows, movies, and original content as part of its subscription service.

Each of these services has its own method of providing an ad-free or ad-skipping experience, ranging from DVR-based solutions that skip ads in recorded content to streaming platforms offering subscription models without ads. As consumer preferences continue to evolve, more such services are likely to emerge, offering different ways to avoid or minimize exposure to TV commercials. However, the services currently available, as described above, have various limitations and disadvantages:

A. Digital Video Recorders (DVRs): DVRs like TiVo allowed viewers to record shows and fast-forward through commercials. However, this method requires planning ahead to record programs, and the fast-forwarding process could be imprecise, causing viewers to skip part of their program or still catch snippets of ads.

B. Subscription-Based Ad-Free Models: Services like Netflix or Hulu (No Ads) offer ad-free viewing for a subscription fee. While effective in removing ads, these services require a regular subscription regardless of how much content is consumed, which might not be cost-effective for all users.

C. Ad-Blocking Technology: For online streaming, ad-blocking software can be used to skip ads. However, this method often leads to conflicts with content providers who rely on ad revenue, and it can lead to technical issues with the streaming service.

D. Pay-Per-View (PPV): PPV allows viewers to pay for individual shows or movies without ads. While this bypasses commercials, it can be expensive for viewers who consume a lot of content and does not apply to regular TV programming.

As shown above, traditional ad models do not cater to individual preferences, often leading to viewer disengagement. Subscription services and PPV do not offer flexible pricing based on viewers' actual consumption or desire to avoid ads. Methods like DVRs offer some control but lack the convenience and precision that modern viewers seek. Also, ad-blocking can harm content providers' revenue streams, potentially impacting the quality and quantity of available content. Moreover, traditional TV and DVRs do not leverage advanced technologies like real-time data analytics and AI, which can enhance the viewing experience.

Therefore, a need exists for a better way for users to choose how and when to skip advertisements while viewing a program, while balancing the needs of advertisers and content providers.

In the prior art, when ads are skipped, random images, videos and sound are displayed and heard. For example, during the duration of the skipped ad, an image or video of a flower garden along with the sounds of birds is displayed and heard. As a result, the user is disengaged and the content replacing the skipped ad is completely ignored. However, more engaging content could be utilized for a better user experience.

Therefore, a need exists for generating content tailored to the user during skipped ads.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Overview of Micropayment Advertisement Suppression Television

The present invention, known as MAST (Micropayment Advertisement Suppression Television), aims to address these limitations by offering a dynamic, user-centric model that allows viewers to pay a micropayment to skip ads, with prices reflecting the real-time market value of the advertising slots. This approach balances the needs and preferences of viewers, advertisers, and content providers.

The present invention enhances the television viewing experience by offering viewers the option to selectively suppress advertisements during commercial breaks for a small fee. This system operates in tandem with Free Advertising Supported Television (FAST TV), which typically provides content funded by advertisements. Key aspects of the present MAST invention include:

A. Viewer Empowerment: It empowers viewers by giving them control over their viewing experience, allowing them to choose whether to watch advertisements or pay a nominal amount to skip them. With respect to live television, MAST incorporates innovative solutions to enhance viewer engagement without interrupting the live experience. Recognizing the unique value of real-time content, MAST introduces "Instant Access Features" during live events. Instead of skipping ads, viewers can opt-in for exclusive content such as live behind-the-scenes footage, instant replays from alternative angles, or interactive experiences directly related to the live event. This model not only retains the live nature of the content but also adds value to ad breaks by transforming them into opportunities for enriched viewer interaction.

B. Dynamic Pricing Model: The fee for ad suppression is dynamically determined based on the real-time value that advertisers are willing to pay to place ads during the specific TV show being watched. This ensures a fair and market-driven approach to ad suppression pricing.

In determining the price for viewers to skip ads, MAST employs a sophisticated algorithm that considers the ad's original purchase price, viewer demographics, content popularity, and historical skipping behavior. This dynamic pricing model operates on a real-time auction system, allowing the cost for skipping ads to fluctuate based on current viewer demand and advertiser value. Furthermore, MAST introduces a loyalty metric, adjusting skipping costs for viewers based on their historical engagement-rewarding viewers who engage more frequently with content or ads with lower prices for ad suppression.

MAST's approach to unfilled ad slots leverages creative content utilization to maintain viewer engagement. For slots without advertiser purchase, MAST integrates fallback content, such as exclusive previews of upcoming shows or user-generated content, ensuring the viewer's experience remains uninterrupted and engaging. Additionally, MAST may showcase promotional material for in-house features or collaborations with educational and non-profit organizations, adding value to the viewing experience. This strategy not only keeps the audience engaged but also promotes a diversified content ecosystem.

C. Integration with Existing Ad Ecosystem: MAST works with the existing advertising infrastructure of FAST TV, utilizing technologies like Server-Side Ad Insertion (SSAI), Supply-Side Platforms (SSPs), and Demand-Side Platforms (DSPs), thereby maintaining the traditional revenue streams for content providers while adding a new one.

D. Enhanced Viewer Experience: By allowing viewers to opt out of ads, MAST aims to improve the overall user experience, making it more enjoyable and personalized.

E. Revenue Generation for Content Providers: MAST offers a dual-revenue model, generating income from traditional advertisers as well as from viewers who choose to pay for an ad-free experience.

F. Innovative Use of Technology: The invention represents an innovative use of technology in the TV advertising space, potentially setting a new standard for how advertisements are managed and consumed in the television industry.

The operation of MAST is quite unique. MAST is integrated with FAST TV systems that traditionally rely on advertising revenue. It works alongside existing Server-Side Ad Insertion (SSAI), Supply-Side Platforms (SSPs), and Demand-Side Platforms (DSPs). At the heart of MAST is an AI algorithm that dynamically calculates the fee for ad suppression. This fee is based on real-time data, including the current bids from advertisers for specific ad slots during a particular show or time slot. Viewers interact with MAST through a user interface (UI) integrated into their TV or streaming service's existing interface. Before a commercial break, viewers are notified of the option to skip ads, along with the associated micropayment fee. Interested viewers can accept the fee and make a micropayment. Once the payment is processed, the SSAI system is instructed to suppress the upcoming advertisements for that viewer.

For every piece of content that includes advertisement breaks, MAST prepares an alternate version devoid of these interruptions. Upon a viewer's decision to skip ads, facilitated by a micropayment, MAST seamlessly transitions the viewer to this ad-free version of the content, ensuring an uninterrupted viewing experience. This transition is executed in such a manner that it preserves the continuity of the viewing experience, without noticeable delays or disruptions.

For pre-recorded content, this methodology is straightforward-viewers are switched to the corresponding ad-free stream, and once the content segment concludes, MAST either synchronizes the viewer back to the live broadcast timeline or employs filler content to smoothly bridge any temporal discrepancies that may have arisen due to skipping ads. This ensures that viewers rejoin the live stream at the correct juncture, maintaining the integrity of the viewing experience.

In the case of live broadcasts, such as news and sports events, where real-time content delivery is paramount, MAST adopts a different protocol. Recognizing the unique challenges presented by live content, we are engaged in close coordination with broadcasting channels to secure access to necessary source content. This collaboration enables smooth integration of MAST's functionality into their linear playout systems, allowing for alternative, value-added services during ad breaks, as previously described, rather than direct ad skipping. Such services enhance the live viewing experience by providing additional content without missing a moment of the live event.

The function of MAST is unique as well. MAST gives viewers control over their viewing experience, allowing them to choose an ad-free experience for specific segments of their watching. Advertisers use the DSP to bid for ad slots. MAST's AI system takes these bids into account when setting micropayment fees for ad suppression. MAST opens a new revenue stream for content providers by allowing viewers to pay for ad suppression, in addition to traditional advertising revenue. The system continuously processes real-time data to adjust the ad suppression fees dynamically and to manage the ad inventory effectively.

MAST also enhances user experience. Viewers use MAST to watch TV shows and movies without interruptions from commercials, by paying a small, dynamically set fee. MAST introduces a pay-per-view-like model for ad suppression, offering flexibility to viewers who do not wish to commit to a full subscription service like Netflix or Hulu. For users, the MAST experience is seamless, integrated into their existing TV or streaming service without the need for additional hardware or software installations. Viewers can choose on a case-by-case basis whether to view ads or pay to suppress them during a single TV program or movie, offering a personalized viewing experience.

As such, MAST revolutionizes the way viewers interact with television advertising, offering a unique blend of viewer choice, dynamic pricing, and seamless integration with existing TV and streaming platforms. It provides an alternative revenue model for content providers and a more personalized, user-controlled TV viewing experience.

MAST is a service-oriented invention that integrates with existing television and streaming technology, and MAST does not have a standalone physical structure in the traditional sense. Instead, it comprises a combination of software and hardware components that work together within the existing infrastructure of digital television and streaming services.

General Software and Hardware Components

In general, with respect to the software components, the core of MAST is an advanced AI algorithm that dynamically calculates the micropayment fee required to suppress ads. This algorithm analyzes various factors like viewer preferences, advertiser bids, and real-time market data. The user interface (UI) is integrated into the television or streaming service's existing interface, allowing viewers to interact with the MAST system, such as opting in or out of ad suppression, and viewing the cost for ad suppression. MAST integrates with Server-Side Ad Insertion (SSAI) technology to manage the seamless insertion and suppression of advertisements in the streaming content. The Demand-Side Platform (DSP) component, enhanced for MAST, facilitates automated ad purchases by advertisers and the new functionality of allowing viewers to bid against these advertisements.

In general, with respect to the hardware components, the primary hardware for MAST is the viewer's television or streaming device, such as a smart TV, set-top box, computer, or mobile device. The backend of MAST, including the AI algorithms and ad management systems, operates on servers, potentially distributed across data centers. These servers handle data processing, content delivery, and transaction processing.

In general, with respect to network infrastructure, MAST relies on existing internet or network infrastructure to transmit data between the viewer's device, the MAST servers, and content providers.

In general, with respect to its payment processing system, a secure digital payment processing system is integrated to handle micropayments from viewers. This system manages transaction authorization, billing, and account management.

The physical structure of MAST is therefore largely virtual and integrated into existing digital and networked systems. Its design leverages current technology infrastructure to provide a seamless and user-friendly experience without the need for additional physical devices.

New Features

MAST introduces several never seen before features in the context of television advertising and viewer interaction. These innovative aspects include:

A. Dynamic Ad-Suppression Pricing: MAST's unique approach to dynamically calculate the price for suppressing ads in real-time based on current advertiser bids is a novel feature. This dynamic pricing model directly correlates the cost of ad suppression with the market value of the ad slot at that particular moment.

B. Viewer-Driven Ad Suppression: Unlike traditional models where ad viewing is mandatory, MAST empowers viewers with the choice to pay a micropayment to suppress ads. This level of control for the viewer over their viewing experience is a significant departure from the norm in TV advertising.

C. Integration with FAST TV and Existing Ad Ecosystem: The system's ability to seamlessly integrate with Free Advertising Supported Television (FAST TV) and work in conjunction with existing ad delivery mechanisms like SSAI, SSPs, and DSPs is a novel feature. This integration ensures that MAST can be adopted without overhauling the current advertising infrastructure.

D. AI-Driven Real-Time Bidding Interface for Viewers: The incorporation of an AI system that not only facilitates automated ad purchases for advertisers but also allows viewers to participate in the bidding process against these ads is a groundbreaking feature. This creates a unique marketplace where the value of ad suppression is determined in real-time.

E. Personalized Viewer Experience: MAST's ability to tailor the viewing experience, including ad suppression options based on individual viewer preferences and habits, harnessing AI and data analytics, adds a layer of personalization that is new to the realm of television broadcasting.

F. Dual Revenue Model: The invention's approach to generating revenue not just from advertisers but also from viewers who opt for ad suppression introduces a novel dual-revenue model to the television industry.

G. Real-Time Market-Driven Ad Valuation: The concept of valuing ad space in real-time based on immediate market conditions and direct viewer input is a new feature in the context of television advertising.

These features collectively represent a significant innovation in the way television advertising is managed and consumed, potentially transforming the industry by providing a more flexible, user-centric, and market-responsive approach.

General Advantages

General advantages include:

1. Enhanced Viewer Experience: By offering the choice to skip ads, MAST enhances the overall viewer experience, potentially increasing viewer engagement and satisfaction.
2. Advanced Technology Use: Leveraging AI for dynamic pricing and viewer preference analysis represents a technologically advanced approach compared to traditional methods.
3. Dual Revenue Stream: MAST's model generates revenue both from advertisers and viewers opting for ad suppression, potentially increasing overall revenue for content providers.

Advantages Over Standard Commercial Breaks

Advantages over standard commercial breaks are:

1. Viewer Control: Unlike standard commercial breaks where viewers have no choice but to watch ads, MAST provides viewers the option to pay a small fee to skip these ads, enhancing viewer autonomy and satisfaction.
2. Dynamic Ad Valuation: MAST's real-time pricing model reflects the current market value of ad space, making it more responsive and potentially more profitable than the fixed-slot advertising model of standard TV.

Advantages over Digital Video Recorders (DVRs) are:

1. Immediate Ad Skipping: MAST allows immediate ad suppression without the need to pre-record content, offering more convenience and spontaneity compared to DVRs.
2. Precise Ad Removal: Unlike the imprecise fast-forwarding of DVRs, MAST provides a seamless viewing experience without the risk of skipping parts of the actual program.

Advantages over Subscription-Based Ad-Free Models are:

1. Pay-Per-Use Flexibility: MAST offers a flexible micropayment option as opposed to the fixed subscription fees of services like Netflix or Hulu, providing a more economical choice for infrequent viewers.
2. Integration with Free Content: MAST works with FAST TV, allowing viewers to access a broader range of content that might not be available on subscription-based platforms.

Advantages over ad-blocking technology are:

1. Content Provider Revenue: Unlike ad blockers that can diminish revenue for content providers, MAST maintains a revenue stream through viewer payments for ad suppression, supporting the content creation ecosystem.
2. Legal and Ethical Compliance: MAST offers an ethical alternative to ad-blocking by providing a legitimate way for viewers to skip ads while compensating content providers. Advantages over pay-per-view (PPV) are:
1. Cost-Effectiveness: MAST could be more cost-effective for viewers compared to the typically higher costs of PPV, especially for those who watch a lot of content but prefer to avoid ads.
2. Ad-Specific Payment: Unlike PPV that charges for content access, MAST charges specifically for ad suppression, giving viewers more control over what they are paying for.

In one aspect, the present invention provides a system comprising: a storage media configured to maintain media content requested by media devices to render for viewing; a media content server configured to distribute a video stream of the media content having an ad space to a media device of a viewer when requested, the media content comprising one or more advertisement pods that each include one or more advertisements owned by one or more advertisers; an advertisement decision service configured to: receive bids from the one or more advertisers for placing the one or more advertisements in the ad space; wherein the ad space is awarded to the advertiser with a bid having the highest purchase price and the advertiser's advertisement is scheduled for viewing in the ad space; an advertisement skip service configured to: display at the media device an option to skip the advertisement for payment of a predetermined sum of money; receive a skip command from the media device to skip the advertisement; process payment for the predetermined sum of money; and suppress the advertisement; wherein the predetermined sum of money is calculated based on the purchase price of the ad space, a profile of the viewer and popularity of the media content; and a secondary content generator configured to: determine a location of the ad space within the media content for which the advertisement is suppressed; perform a semantic analysis of the media content; generate secondary content based on the semantic analysis; and insert the secondary content in the ad space.

In another aspect, the present invention provides a system comprising: a storage media configured to maintain media content requested by media devices to render for viewing; a media content server configured to distribute a video stream of the media content having an ad space to a media device of a viewer when requested, the media content comprising one or more advertisement pods that each include one or more advertisements owned by one or more advertisers; an advertisement decision service configured to: receive bids for a purchase price of the ad space from the one or more advertisers for placing the one or more advertisements in the ad space; an advertisement skip service configured to: display at the media device an option to skip the advertisement for payment of a predetermined sum of money; receive a skip command from the media device to skip the advertisement; process payment for the predetermined sum of money; and suppress the advertisement; and a secondary content generator configured to: generate secondary content; and insert the secondary content in the ad space.

In yet another aspect, the present invention provides a method comprising the steps of: a media content server: distributing, by a media content server, a video stream of the media content having an ad space to a media device of a viewer when requested, the media content comprising one or more advertisement pods that each include one or more advertisements owned by one or more advertisers; an advertisement decision service: receiving bids from the one or more advertisers for placing the one or more advertisements in the ad space; and awarding the ad space to the advertiser with a bid having the highest purchase price and scheduling the advertisement associated with the highest purchase price for viewing in the ad space; an advertisement skip service: displaying at the media device an option to skip the advertisement for payment of a predetermined sum of money; receiving a skip command from the media device to skip the advertisement; processing payment for the predetermined sum of money; and suppressing the advertisement; a secondary content generator: generating secondary content; and inserting the secondary content in the ad space.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
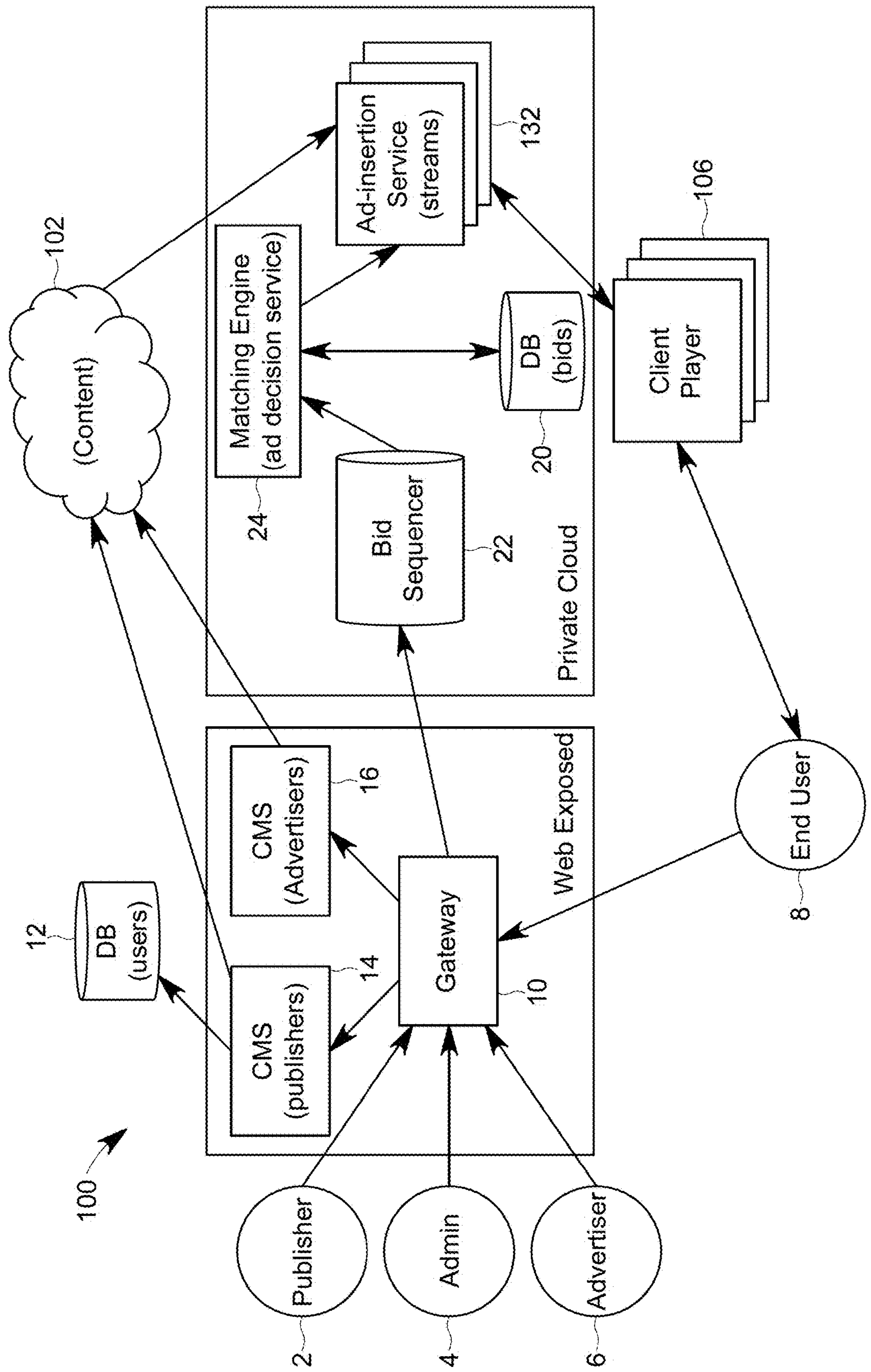
FIG. 1 is a schematic of an embodiment of the system of the present invention.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

MAST System

Figure 2:
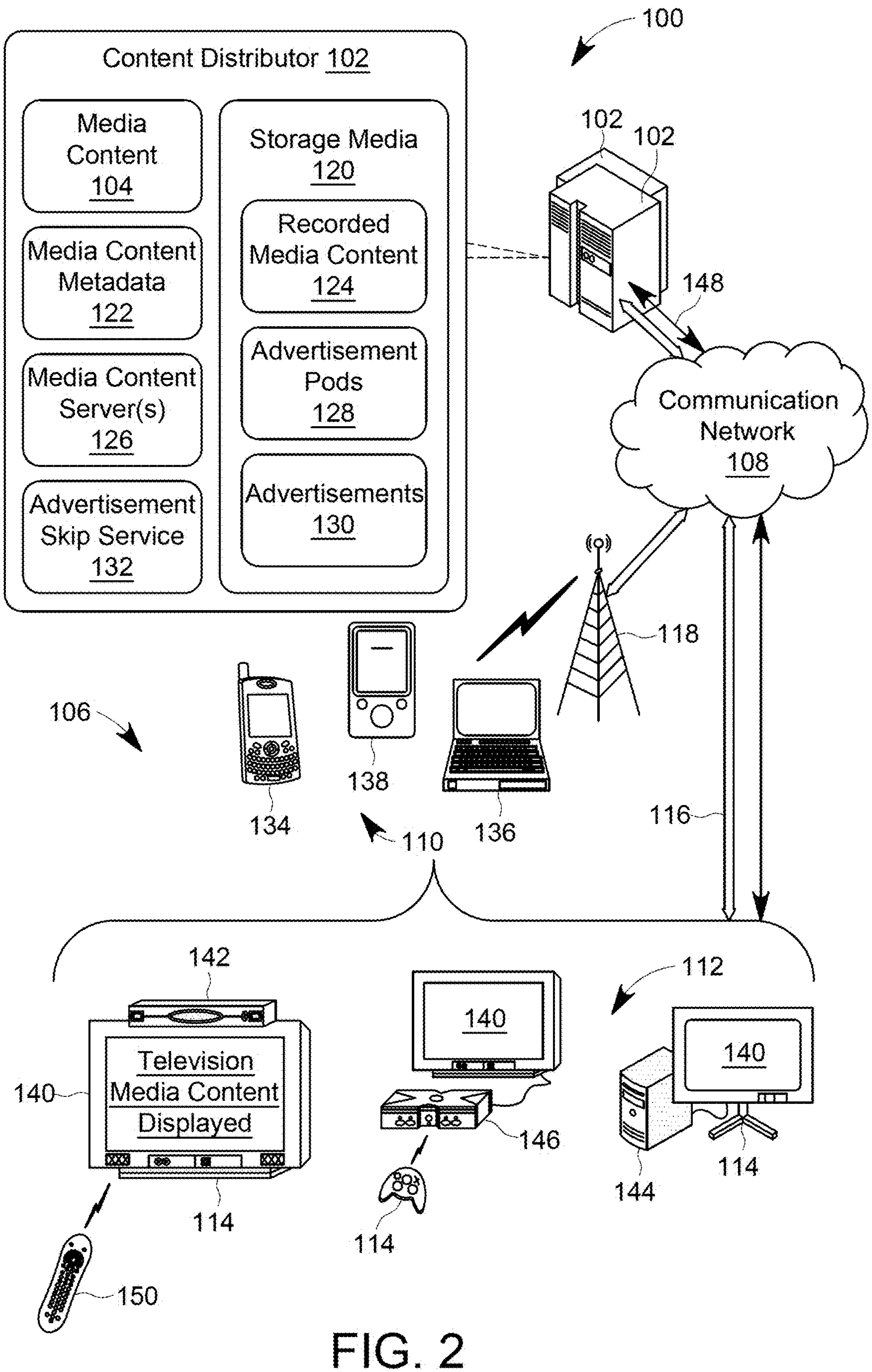
FIG. 2 illustrates an embodiment of a content distributor of the system of the present invention.

Referring to FIGS. 1 and 2, a schematic of an embodiment of the system 100 of present invention, known as MAST, is shown. In general, publishers 2, administrators 4, advertisers 6 and end users 8 separately connect to a web-based portal or gateway 10 via a communication network, which handles authentication and rate limiting, among other things, and allows access to settings to accounts and the ability to upload content, which are stored on a data server within a content distributor 102. Data relating to the user is separately stored in a user database 12. Publishers 2 use their content management system (CMS) 14 to upload media content 104 (e.g., VODs, movies, streams, etc.) and advertisers 6 use their CMS 16 to upload advertisements and ad snippets 130. In this embodiment, content uploaded by publishers and advertisers 104, 130 are stored within the content distributor 102 on a cloud server to minimize cost. However, a physical on-location server could be used to store any of the aforementioned data and content.

Referring to FIGS. 1 and 2, the system 100 includes one or more content distributors 102 for processing the data and content of the publishers 2, advertisers 6 and end users 8, and communicating or otherwise providing media content 104 to any number of various media devices 106, directly or indirectly, via a communication network 108. The various media devices 106 can include wireless media devices 110 as well as other client devices 112 (e.g., wired and/or wireless devices) that are implemented as components in various client systems 114 in a media content distribution system.

The communication network 108 can be implemented to include a broadcast network, an IP-based network 116, and/or a wireless network 118 that facilitates media content distribution and data communication between the content distributors 102 and any number of the various media devices 106. The communication network 108 can also be implemented as part of a media content distribution system using any type of network topology and/or communication protocol and can be represented or otherwise implemented as a combination of two or more networks.

Referring to FIG. 2, the content distributor 102 includes storage media 120 to store or otherwise maintain various data and media content, such as media content 104, media content metadata 122, and/or recorded media content 124 (e.g., recorded on-demand assets, recorded movies, recorded television programming, etc.). In a Network Digital Video Recording (nDVR) implementation, recorded on-demand assets can be recorded when initially distributed to the various media devices as scheduled television media content. The storage media 120 can be implemented as any type of memory, random access memory (RAM), a nonvolatile memory such as flash memory, read only memory (ROM), and/or other suitable electronic data storage. The content distributor 102 can also include one or more media content servers 126 that are implemented to communicate, or otherwise distribute, the media content 104, media content metadata 122, recorded media content 124, and/or other data to any number of the various media devices 106.

The media content 104 and/or recorded media content 124 can include any type of audio, video, and/or image media content received from any type of media content source. As described throughout, "media content" can include television programs or programming (live or recorded), advertisements, commercials, music, movies, and on-demand media content. Other media content or recorded media content can include interactive games, network-based applications, and any other audio, video, and/or image content (e.g., to include program guide application data, user interface data, search results and/or recommendations, and the like).

The media content 104 and/or the recorded media content 124 can include desired programming (e.g., a television show, movie, or sporting event that a viewer desires to watch), as well as one or more advertisement pods 128. An advertisement pod 128 can include one or more advertisements 130 or commercials for various products and/or services. Thus, a video stream of recorded media content 124 that is distributed to a media device 106 can include multiple segments of desired programming interspersed or separated by multiple advertisement pods 128, each having one or more advertisements 130.

As shown in FIG. 2, the content distributor 102 also includes an advertisement skip service or ad-insertion service 132 that can be implemented as computer-executable instructions and executed by processor(s) to implement the various embodiments and/or features described herein. In addition, the content distributor 102 can be implemented with any number and combination of differing components. The advertisement skip service or ad-insertion service 132, as well as other functionality described to implement embodiments of advertisement skip system and method of the present invention, can also be provided as a service apart from the content distributor 102 (e.g., on a separate server or by a third-party service such as the ad-insertion service 132 shown in FIG. 1).

Referring to FIGS. 1 and 2, the advertisement skip service 132 at content distributor 102 (FIG. 2) or provided by a third-party (FIG. 1) can be implemented to receive a skip command from a media device 106 and skip an advertisement 130 in an advertisement pod 128 that is rendered for viewing at the media device 106. Alternatively, the advertisement 130 can be displayed full-screen while the media content 104 is temporarily paused while displaying the advertisement 130.

Bidding for Ad Space and Skipping Ads

Referring to FIG. 1, prior to and during distribution of media content 104, advertisers 6 bid for ad space. Each bid is stored in a queue 22 with an incremental identifier. In case of duplicate bids, the first bidder becomes the winner. The end user 8 may also bid to skip all ads for the current program showing the media content 104 altogether. An ad decision service (ADS) 24 determines which advertising entity is the winner for a particular ad space and stores all winning bids on storage media 20. Depending on the volume of winning bids they can be stored in a traditional database or in-memory storage such as Redis. In this embodiment, the bid sequencer or queue 22, ADS 24 and bid storage media 20 are located on a private server, preferably a cloud server, and is coupled with a processor for determining winning advertisement bids and assigning ads 130 to corresponding ad spots.

Figure 4:
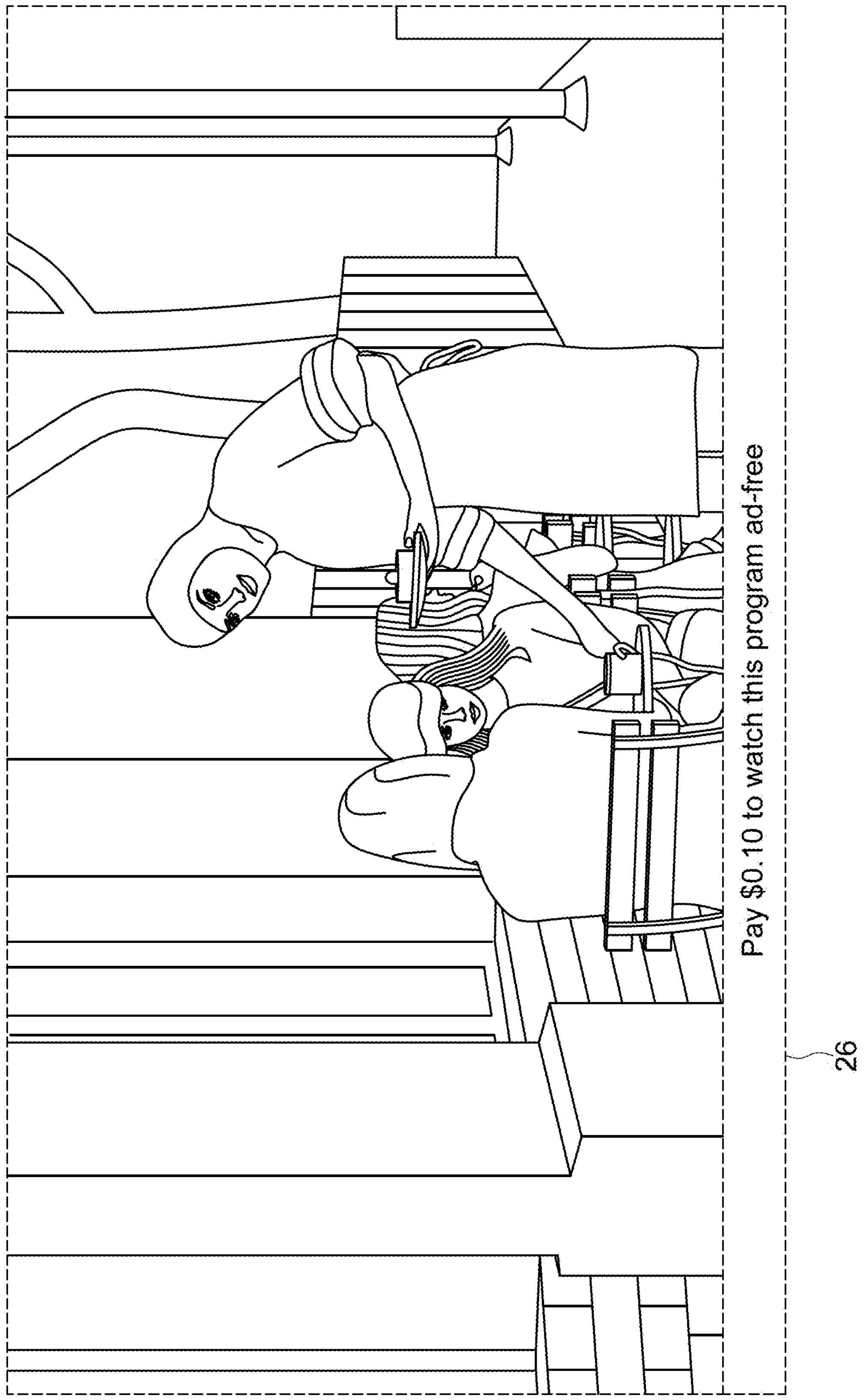
FIG. 4 is an example screenshot of a user device of an advertisement and a prompt for the user to suppress advertisements via micropayment during a television program or movie.

For each particular ad space, the advertisement skip service or ad-insertion service 132 retrieves the latest highest bidder the specific ad space from the ADS 24 and the associated ads from the media content server 126 and inserts the ad 130 at a pre-determined time to the media content 104 that is playing at that time. In the case the end user 8 has not paid to skip ads 130, the ad 130 is stitched into the stream and played. The ad 130 can be stitched into the media content directly, or the media content 104 can be paused during the current stream and an ad-stream can be added instead, before switching back to the media content 104 that was playing. In this embodiment, a content delivery network (CDN) is used to get global reach and minimize latency and buffering time. The client player 106 fetches the media content stream from the CDN and the user 8 can push the "skip ads" 26 icon for a small fee, as shown in FIG. 4. If selected, a command is communicated back to the ad decision service 24 and the media content 104 resumes playing. All user data, including ads viewed and not viewed, are stored on the data server 12 for reporting and analysis.

For every piece of content that includes ad breaks, a corresponding version without these breaks is also available. Upon receiving payment from the user to skip all ads, the system seamlessly transitions viewers to the ad-free version of the content. Once the program concludes, the program either syncs back to the live timeline or a filler content is introduced to bridge any gaps. This method applies predominantly to pre-recorded content, as live broadcasts like news and sports will inherently follow a different protocol.

The present MAST invention would work for different scenarios. MAST's core concept of allowing users to skip ads through micropayments is primarily designed with prerecorded content (but that is played live) in mind. However, adapting this model to live television presents unique challenges and opportunities. For live television, prior to publication, the administrator 4 coordinates closely with channels to secure all necessary source content for a smooth integration into their linear playout systems. For live TV, MAST implements a delay buffer system where live content is slightly delayed, enabling the ad-skip feature and the switching parallel content with no ads. This buffer does not need to be long-just enough to assess and price the ad in real-time. For live events where viewers may not want any delay, MAST could offer alternative value-added services instead of skipping, such as accessing additional content (e.g., behind-the-scenes, alternative angles, etc.) during ad breaks.

In the present invention, the price for skipping an ad is dynamically calculated based on several factors, including the ad's purchase price, the viewer's profile, and content popularity. More expensive ads (to the advertiser) would typically cost more for the viewer to skip. This could be based on a real-time bidding system where the ad's skip price fluctuates based on demand and viewer interest, which is determined by the ADS 24. Additionally, viewer data influences pricing. For instance, users who rarely skip ads might be offered lower prices as an incentive, whereas frequent skippers might see higher prices. This user data is stored in and retrieved from the data server 12.

To ensure the economic viability of the MAST model, establishing minimum thresholds for both ad prices (for advertisers) and ad skipping prices (for users) is crucial. Minimum ad price for advertisers is determined by the platform's operational costs, market value, and competitive pricing strategy. It ensures that the advertising space on MAST remains premium and that the platform covers its costs. Minimum ad skipping price for users could be a nominal fee, ensuring that the feature is accessible but not so low that it undermines the ad model's integrity. The minimum price could be adjusted based on content type, viewer loyalty, and other engagement metrics to balance affordability with revenue generation. The ADS 24 implements these strategies with a sophisticated backend system capable of real-time data processing and dynamic pricing, alongside a transparent user interface that communicates the value proposition to both viewers 8 and advertisers 6.

In the present invention, for ad slots or ad spaces not purchased by advertisers, MAST has several non-limiting options. Examples are:

(i) Fallback Content: Instead of traditional ads, MAST inserts alternative content, such as previews for upcoming shows, platform announcements, or user-generated content, as will be described below. This will maintain viewer engagement without devaluing the ad space.

(ii) Promotional Material: Use these slots for promoting in-house content or platform features, effectively keeping the viewer engaged and possibly increasing platform loyalty.

(iii) Partner Content: Collaborate with non-profits, educational institutions, or content partners to fill these slots with informative or entertaining content that doesn't require payment from the advertisers but adds value to the viewer's experience.

Method of Generating Secondary Content

Figure 5:
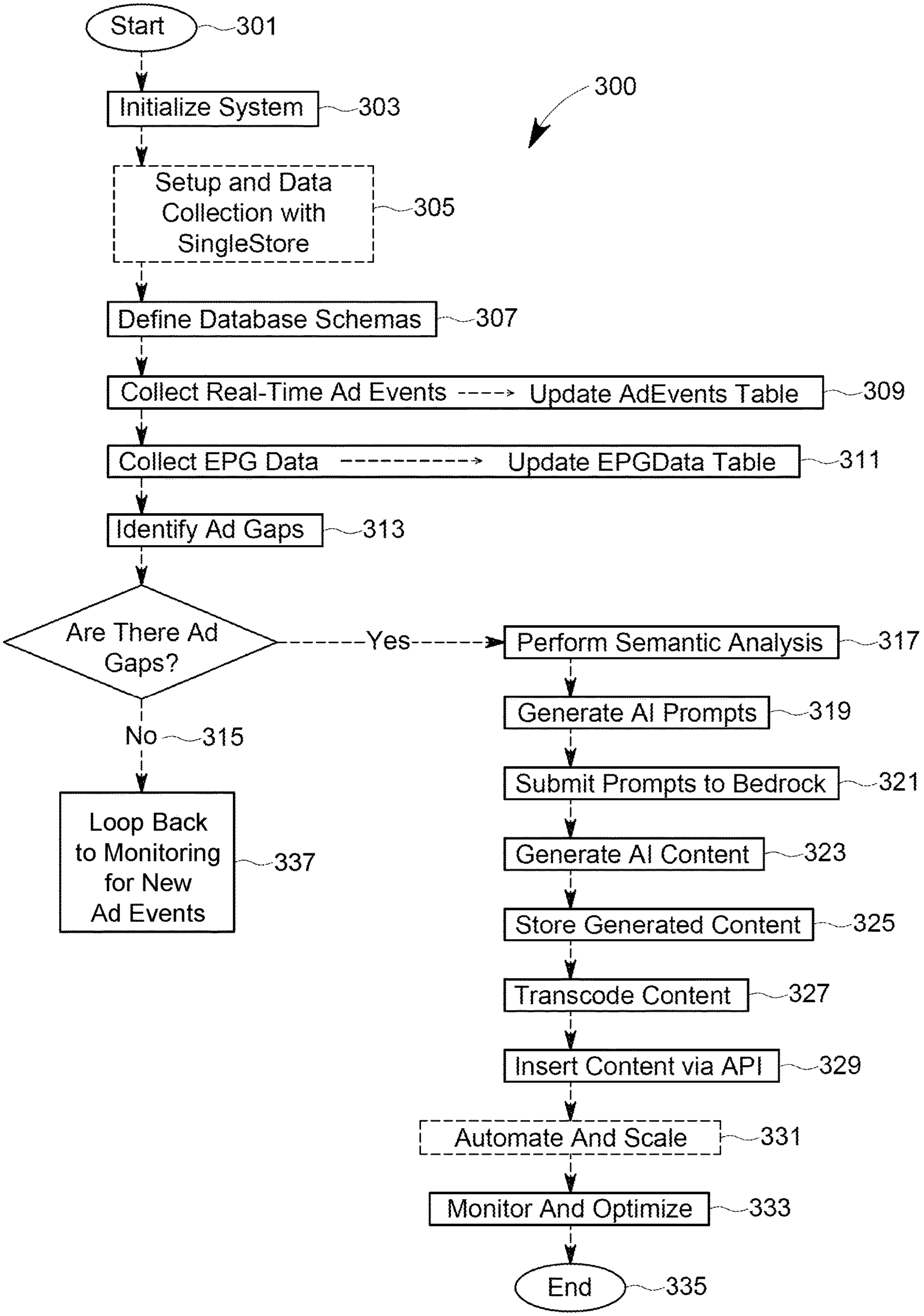
FIG. 5 shows a flowchart of an embodiment of a method of the present invention for generating secondary content.

FIG. 5 illustrates an embodiment of a method 300 of the present invention for generating secondary content and integrating with the advertisement skip service 132, 214 and ad decision service 24 described above. Specifically, the method 300 is for filling ad gaps with content when ads are skipped by the user during live programs and/or to fill empty ad space for both recorded and live programs. In this embodiment, the content is generated with AI-generated content and ensures an uninterrupted and personalized viewer experience. This process integrates generative AI to dynamically produce personalized content that fills the exact time duration of skipped ads. The objective is to ensure that when a viewer skips ads during recorded and live programs, this previously empty time slot is replaced with engaging, tailored content. This content could include behind-the-scenes footage, trivia, interviews, or personalized recommendations based on the viewer's preferences, maintaining engagement without traditional advertisements. When the advertisement skip service 132, 214 receives a skip command and processes payment, it notifies both the ad decision service 24 (to update the ad space or ad slot's status) and the secondary content generator to produce content that seamlessly replaces the suppressed ad space or ad slot.

Referring to FIG. 5, the process is started in step 301, and the system and the various programs used in the process are initialized in step 303. One of the programs used is a cloud-native, distributed SQL database to address the need for high-performance, scalable data processing and analytics. In this embodiment, SingleStore is used for this function, however, other programs can be used as well. Another program used is a program for building generative AI applications. In this embodiment, Amazon Bedrock is used, however, other programs can be used as well. The method 300 also utilizes a transcoding service for formatting generated content to fit playout requirements, and a playout application programming interface (API) integration program for inserting generated content into the program 104 seamlessly. In particular, the ad decision service 24 provides metadata about the scheduled advertisements, enabling the system to determine the precise time slots that require secondary content once the skip service 132, 214 suppresses an ad.

In step 305, setup and data collection is performed with SingleStore. First, database schemas are defined in step 307 by creating tables for ad events in step 309. The ad events could be filled, unfilled or suppressed ads. The ad events are stored in a table and named "AdEvents." An example of programming code for step 309 is as follows:

```
CREATE TABLE AdEvents (
event_id INT PRIMARY KEY,
program_id INT,
ad_slot_time INT,
ad_status VARCHAR (20),
event_timestamp TIMESTAMP
);
```

At this stage, the system is merely establishing data structures. The secondary content generator will later rely on these tables, in coordination with the advertisement skip service 132, 214 and the ad decision service 24, to identify which ad slots need alternative content.

In step 309, the results of semantic analysis from Amazon Bedrock are stored for each program segment. Data such as genre and mood of the program segment are stored in a table named "ContentAnalysis." An example programming code for storing this data is as follows:

```
CREATE TABLE ContentAnalysis (
analysis_id INT PRIMARY KEY,
program_id INT,
semantic_features JSON,
timestamp TIMESTAMP
);
```

Next, in step 311, Electronic Program Guide (EPG) data is collected with details on program schedules and stored in a table named "EPGData." An example programming code for step 311 is as follows:

```
CREATE TABLE EPGData (
epg_id INT PRIMARY KEY,
program_id INT,
title VARCHAR(255),
description TEXT,
start_time TIMESTAMP,
end_time TIMESTAMP
);
```

In each of steps 309 and 311, data is collected real-time to track ad suppression and fill statuses. SingleStore's high-performance capabilities allow fast, real-time writes, so ad events can be stored immediately upon detection.

In step 313, ad gaps are identified and calculated. Using SingleStore, the AdEvents table from step 309 is queried to determine which ad slots are suppressed or unfilled, and total ad gaps are calculated based on the information. An example programming code for this step is as follows:

```
SELECT program_id, SUM(ad_slot_time) AS total_gap_time
FROM AdEvents
```

-continued

```
WHERE ad_status = 'suppressed' OR ad_status = 'unfilled'
GROUP BY program_id;
```

Once the advertisement skip service 132, 214 confirms a "suppressed" status for a particular ad, that information is relayed to the ad decision service 24 so that the system can precisely mark the ad space or ad slot as available for secondary content generation.

Using SingleStore, relevant information from AdEvents, ContentAnalysis, and EPGData is combined to create a consolidated dataset for each program 104. In step 315, if there are no ad gaps, i.e., skipped ads, then the process loops back to monitoring new ad events in step 337. If there are ad gaps, semantic analysis is performed in step 317 using Amazon Bedrock. Specifically, generative models are used to analyze the context and mood of the program 104. For example, if Bedrock identifies a program as "action" with a "high-energy" mood, it can influence the generated content type. The resulting features are stored in the ContentAnalysis table. These steps ensure that when the skip service 132, 214 suppresses an ad, the secondary content generator is immediately equipped with contextual information necessary to produce relevant filler content.

Then, using SingleStore, AI prompts are generated in step 319 by pulling together EPGData, AdEvents, and ContentAnalysis records to create a text prompt based on program details and user preferences. For example, a prompt such as the following could be generated:

Generate a 3-minute video with action-themed trivia and behind-the-scenes insights to replace a skipped ad segment for [Program Title].

The prompt generation is automated with a script or task automation on the server of the ad-insertion service 132 using, for example, Linux commands like cron jobs, to continuously track and store new data. Additionally, the ad decision service 24 provides metadata about the duration of the previously inserted ad so the generator knows the exact length of content to create.

The prompts generated in step 319 are submitted to Bedrock in step 321 and ad content is generated with Bedrock in step 323 using Bedrock's generative models, which have text-to-video or video-to-video capabilities. This content could include behind-the-scenes footage, trivia, interviews, or personalized recommendations. In step 325, the AI-generated video is then stored in a cloud object storage such as an Amazon S3 bucket, while tracking the file location in SingleStore. An example programming code for step 325 is as follows:

```
INSERT INTO GeneratedContent (program_id, content_url, timestamp)
VALUES (?, 's3://path_to_generated_content', NOW( ));
```

Here, the advertisement skip service 132, 214 is effectively the "triggering mechanism," instructing the secondary content generator to produce and store the filler content as soon as a user elects to skip an ad.

In step 327, using a transcoding service, the bitrate of the AI-generated content is adjusted to meet the requirements of different playout providers. In step 329, using the API of the playout service provider, the transcoded content is inserted into the program 104 or media content's timeline, replacing the suppressed ad slot with the generated secondary content. This is communicated by the advertisement skip service 132, 214 or ad decision service 24 through the communication network 108. The entire insertion process is coordinated with the advertisement skip service 132, 214 and the ad decision service 24 to ensure that the newly generated content seamlessly aligns with the media stream, thereby preserving viewer engagement.

In step 331, the steps described above are automated, preferably with cron jobs or a task scheduler, to continually monitor and process new ad suppression events, generate content, and insert ads dynamically. In step 333, using SingleStore's real-time analytics, the usage and performance of the process is monitored, allowing for continual adjustments to enhance user engagement. Upon completion, the secondary content generation program is ended at step 335. This ongoing automation closes the loop between the ad decision service (which manages ad slot status), the advertisement skip service (which processes skip requests), and the secondary content generator (which produces and inserts AI-driven material).

The method shown in FIG. 5 and described above creates a robust, scalable system, dynamically filling ad gaps with engaging, personalized content using the power of AI and real-time data handling. Whenever the user's skip action is validated by the advertisement skip service 132, 214, the secondary content generator collaborates with the ad decision service 24 to confirm the available time window and context, ensuring minimal disruption and consistent viewer engagement.

Accordingly, the invention seamlessly integrates the functions of the advertisement skip service 132, 214, the ad decision service 24, and the secondary content generator. By maintaining a real-time flow of data between these components, the system can replace skipped ads with meaningful, context-specific material while preserving user immersion. The method shown in FIG. 5 and described above creates a robust, scalable system for addressing skipped advertisement gaps and, as a result, enhances both viewer satisfaction and overall platform revenues.

Communication and Media Devices

Referring to FIG. 2, the wireless media devices 110 can include any type of device implemented to receive and/or communicate wireless data, such as any one or combination of a mobile phone device 134 (e.g., cellular, VoIP, WiFi, etc.), a portable computer device 136, a media device 138 (e.g., a personal media player, portable media player, etc.), and/or any other wireless media device that can receive media content in any form of audio, video, and/or image data. Each of the client systems 114 include a respective client device and display device 140 that together render or playback any form of audio, video, and/or image media content.

Still referring to FIG. 2, a display device 140 can be implemented as any type of a television, high-definition television (HDTV), LCD, or similar display system. A client device in a client system 114 can be implemented as any one or combination of a television client device 142 (e.g., a television set-top box, a digital video recorder (DVR), etc.), a computer device 144, a gaming system 146, an appliance device, an electronic device, and/or as any other type of client device that may be implemented to receive media content in any form of audio, video, and/or image data in a media content distribution system.

Any of the media devices 106 can be implemented with one or more processors, communication components, memory components, signal processing and control circuits, and a media content rendering system. Further, any of the wireless media devices 110 and/or other client devices 112 can be implemented with any number and combination of differing components. A media device may also be associated with a user or viewer (i.e., a person) and/or an entity that operates the device such that a media device describes logical devices that include users, software, and/or a combination of devices.

Any of the wireless media devices 110 and/or other client devices 112 can communicate with any number of content distributors 102 via a two-way data communication link 148 of the communication network 108. It is contemplated that any one or more of the arrowed communication link 148, IP-based network 116, and wireless network 118, along with communication network 108, facilitate two-way data communication, such as from a media device 106 to a content distributor 102 and vice-versa.

Generally, any of the functions, methods, procedures, components, and modules described herein can be implemented using hardware, software, firmware (e.g., fixed logic circuitry), manual processing, or any combination thereof. A software implementation of a function, method, procedure, component, or module represents program code that performs specified tasks when executed on a computing-based processor. The method described above may be described in the general context of computer-executable instructions. Generally, computer-executable instructions can include software, applications, routines, programs, objects, components, data structures, procedures, modules, functions, and the like.

The method may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Although illustrated and described as a component or module of the content distributor 102, the advertisement skip service 132 can be implemented as an independent service to implement embodiments of advertisement skip view. Further, although the advertisement skip service 132 is illustrated and described as a single component or module, the advertisement skip service 132 can be implemented as several component applications or modules distributed to implement various embodiments of advertisement skip view as described herein.

Figure 3:
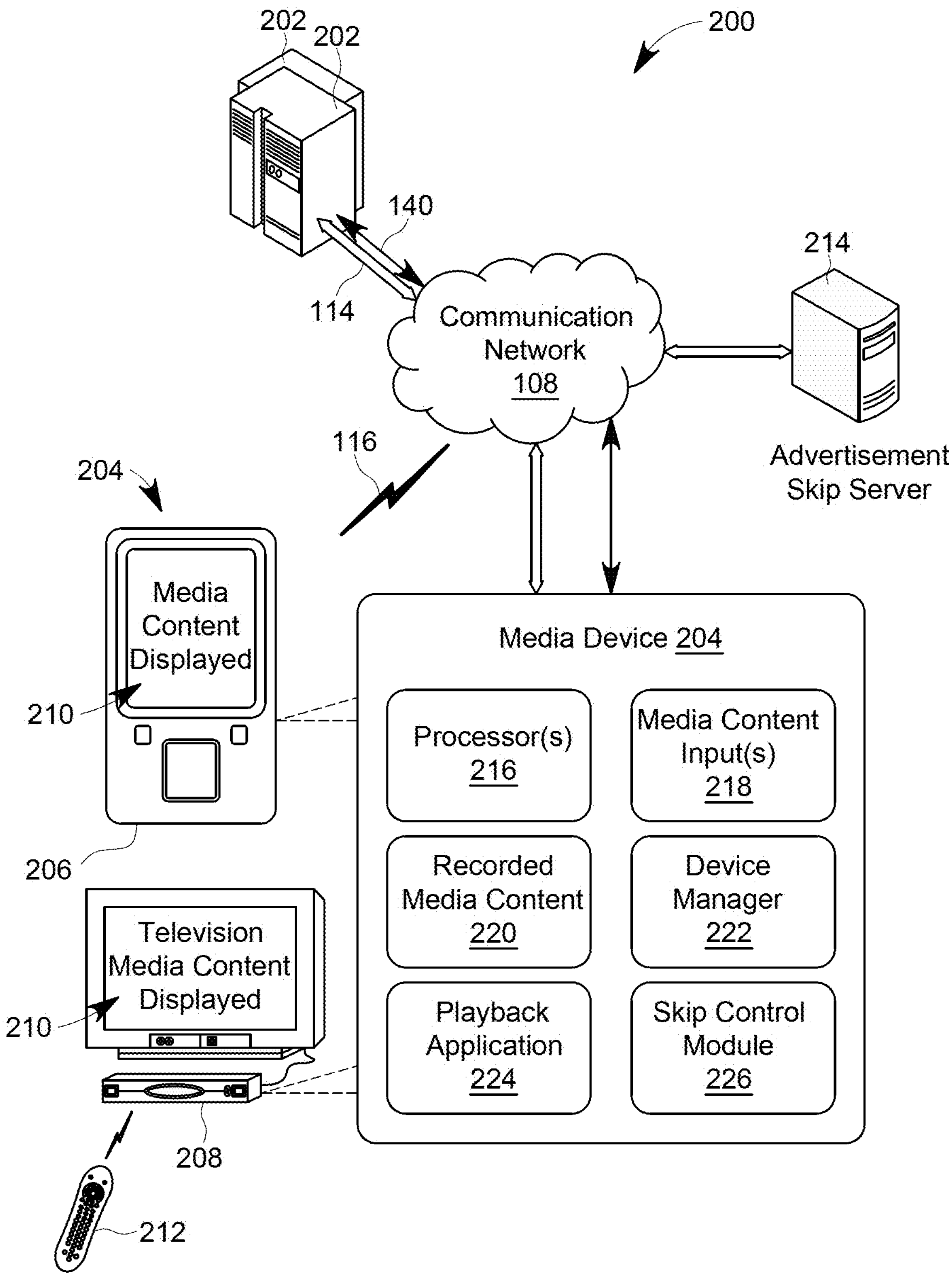
FIG. 3 illustrates an embodiment of a media device of the system of the present invention.

FIG. 3 illustrates an example system 200 in which various embodiments of advertisement skip view can be implemented. In this example, system 200 includes one or more content distributors 202 and examples of wired and/or wireless media devices 204, such as a portable media device 206 and a television client device 208. A media device 204 can display various types of media content 210 (to include television media content). A viewer can interact with a media device 204 and initiate user inputs and selections of various media content navigation commands, such as on the portable media device 206 or with a remote control input device 212.

In FIG. 3, an example of a content distributor is described with reference to content distributor 102 shown in FIGS. 1 and 2. However, in this example system 200, an advertisement skip service 214 is independent and implemented apart from content distributor 202 (e.g., on a separate server or by a third-party service 132 as shown in FIG. 1). The advertisement skip service 214 can be implemented as an optional service and/or as a service that users pay for to receive advertisement skip controls and/or any of the features and aspects of advertisement skip view. The advertisement skip service 214 can implement any of the techniques described above with reference to the advertisement skip service 132 shown in FIGS. 1 and 2. The content distributor 202, advertisement skip service 214, and the media devices 204 can all be implemented for communication with each other via the communication network 108, the IP-based network 116, and/or the wireless network 118.

In the example system 200, a media device 204 includes one or more processors 216 (e.g., any of microprocessors, controllers, and the like), media content inputs 218, and recorded media content 220 (e.g., media content that has been received and recorded, recorded media content that is being received, recommended media content, etc.). The media content inputs 218 can include any type of wireless, broadcast, and/or over-the-air inputs via which media content is received.

Media device 204 can also include a device manager 222 (e.g., a control application, software application, signal processing and control module, etc.) that can be implemented as computer-executable instructions and executed by the processors 216 to implement various embodiments and/or features of advertisement skip view. The device manager 222 can be implemented to monitor and/or receive selectable inputs (e.g., viewer selections, navigation inputs, etc.) via an input device 212, and initiate communication of user selections back to a content distributor 202 and/or the advertisement skip service 214.

Media device 204 can also include a playback application 224 that can be implemented as computer-executable instructions and executed by the processors 216 to implement various embodiments and/or features of advertisement skip view. The playback application 224 can be implemented as a media control application to control the playback of recorded media content 220 and/or any other audio, video, and/or image media content that can be rendered and/or displayed for viewing at or in association with a media device 204.

Media device 204 can also include a skip control module 226 that is local to a specific media device to implement any of the features and aspects of advertisement skip view. The skip control module 226 can implement any of the techniques described above with reference to the advertisement skip service 132 shown in FIG. 2. The skip control module 226 at media device 204 can be implemented to receive a skip command, such as from remote control input device 212, and skip an advertisement in an advertisement pod 128 that is rendered for viewing by the media device 204.

Alternatives

MAST, while innovative in its approach, can have alternative methods, materials, or apparatus for its operation, enhancing its adaptability and applicability in various contexts. These alternatives can be considered in terms of software, hardware, and operational methodologies.

The alternative software approaches are as follows:

1. Different AI Algorithms: Instead of the proposed AI model, alternative machine learning or deep learning algorithms could be used for dynamic pricing and ad suppression decisions.
2. Blockchain for Transactions: Blockchain technology could be implemented for micropayment processing, offering enhanced security and transparency in transactions.
3. Cloud-Based Platforms: The system could be entirely cloud-based, reducing the need for heavy on-premise server infrastructure and enabling more scalable and flexible deployment.

The alternative hardware configurations are as follows:

1. Devices: Instead of relying on existing smart TVs or set-top boxes, MAST could be offered through a dedicated hardware device that users can connect to their TVs.
2. Mobile Integration: The system could be primarily operated through a mobile app, allowing users to control ad suppression on their TVs directly from their smartphones.
3. Wearable Tech Integration: For a more futuristic approach, integration with wearable technology (like smartwatches) could enable users to control viewing preferences and payments.

Alternative methodologies are as follows:

1. Subscription-Based Model: An alternative to the pay-per-ad-suppression model could be a subscription model where users pay a monthly fee for a certain number of ad-free hours or shows.
2. Viewer Engagement Models: Instead of a straightforward payment model, engagement-based models like watching certain ads to earn credits (which can then be used to suppress other ads) can be considered.
3. Collaborative Filtering for Ad Recommendations: Instead of suppressing ads, the system could use AI to recommend ads tailored to the viewer's interests, creating a more engaging ad experience.
4. Gamification: Integrating gamification elements where viewers can earn points or rewards for watching certain ads or participating in interactive ad content.

These alternatives offer various ways to enhance or modify the MAST system, providing flexibility to adapt to different technological environments, user preferences, and market conditions. Each alternative brings its own set of advantages and potential challenges, and the choice of which alternative to implement would depend on factors like target audience, technological infrastructure, and business objectives.

The Micropayment Advertisement Suppressed Television (MAST) system presents several advantages over prior existing technologies and methods used in TV advertising and viewing.

As shown above, MAST addresses several limitations of previous methods by offering greater viewer control, flexible payment options, enhanced user experience, and a technologically advanced, dual-revenue model. This represents a significant step forward in the evolution of television advertising and consumption.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes which come within the meaning and range of equivalency of the claims are to be embraced within their scope.

The invention claimed is:

1. A system comprising:

one or more storage media configured to maintain media content requested by media devices to render for viewing;

a media content server configured to distribute a video stream of the media content having an ad space to a media device of a viewer when requested, the media content comprising one or more advertisement pods that each include one or more advertisements owned by one or more advertisers;
an advertisement decision service configured to:
receive bids from the one or more advertisers for placing the one or more advertisements in the ad space;
wherein the ad space is awarded to the advertiser with a bid having the highest purchase price and the advertiser's advertisement is scheduled for viewing in the ad space, and
wherein the advertisement decision service is further configured to accept bids that meet a minimum purchase price, wherein when none of the bids meet the minimum purchase price, secondary content is scheduled for viewing in the ad space;
an advertisement skip service configured to:
display at the media device an option to skip the advertisement for payment of a sum of money;
receive a skip command from the media device to skip the advertisement;
process payment for the sum of money; and
suppress the advertisement;
wherein the sum of money is dynamically determined as a payment, based on the purchase price of the ad space, a profile of the viewer and popularity of the media content; and
a secondary content generator configured to:
determine a location of the ad space within the media content for which the advertisement is suppressed;
perform a semantic analysis of the media content;
generate secondary content based on the semantic analysis; and
insert the secondary content in the ad space.

2. The system of claim 1, wherein the media content is one of a recorded program and a live program.

3. The system of claim 2, wherein the live program is buffered.

4. The system of claim 1, wherein in the event that a plurality of advertisers bid an identical highest purchase price, the ad space is awarded to the advertiser with the earliest bid.

5. The system of claim 1, wherein the secondary content is selected from a group consisting: behind-the-scenes footage of the media content, trivia, interviews and personalized recommendations.

6. The system of claim 1, wherein the secondary content generator is configured such that when the media content is a recorded program, the secondary content generator is disabled.

7. A system comprising:
one or more storage media configured to maintain media content requested by media devices to render for viewing;
a media content server configured to distribute a video stream of the media content having an ad space to a media device of a viewer when requested, the media content comprising one or more advertisement pods that each include one or more advertisements owned by one or more advertisers;
an advertisement decision service configured to:
receive bids for a purchase price of the ad space from the one or more advertisers for placing the one or more advertisements in the ad space, wherein the advertisement decision service is further configured to accept bids that meet a minimum purchase price, wherein when the bids do not meet the minimum purchase price, secondary content is scheduled for viewing in the ad space;
an advertisement skip service configured to:
display at the media device an option to skip the advertisement for payment of a sum of money;
receive a skip command from the media device to skip the advertisement;
process payment for the sum of money; and
suppress the advertisement; and
a secondary content generator configured to:
generate secondary content; and
insert the secondary content in the ad space.

8. The system of claim 7, the advertisement decision service configured is configured such that, when a plurality of bids meet the minimum purchase price, the ad space is awarded to the advertiser with a bid having the highest purchase price and the advertiser's advertisement is scheduled for viewing in the ad space.

9. The system of claim 8, wherein in the event that a plurality of advertisers bid an identical highest purchase price, the ad space is awarded to the advertiser with the earliest bid.

10. The system of claim 7, wherein the sum of money is calculated based on one of or more of: the purchase price of the ad space, a profile of the viewer and popularity of the media content.

11. The system of claim 7, wherein the secondary content generator is further configured to:
determine a location of the ad space within the media content for which the advertisement is suppressed;
perform a semantic analysis of the media content; and
generate the secondary content based on the semantic analysis.

12. The system of claim 7, wherein the advertisement skip service transmits a notification to the secondary content generator identifying a suppressed ad space, and the secondary content generator inserts secondary content in the suppressed ad space.

13. A method comprising the steps of:
a media content server:
distributing, by a media content server, a video stream of media content having an ad space to a media device of a viewer when requested, the media content comprising one or more advertisement pods that each include one or more advertisements owned by one or more advertisers;
an advertisement decision service:
receiving bids from the one or more advertisers for placing the one or more advertisements in the ad space;
awarding the ad space to the advertiser with a bid having the highest purchase price and scheduling the advertisement associated with the highest purchase price for viewing in the ad space; and
accepting bids that meet a minimum purchase price for another ad space, wherein when the bids for the other ad space do not meet the minimum purchase price, secondary content is scheduled for viewing in the other ad space;
an advertisement skip service:
displaying at the media device an option to skip the advertisement for payment of a sum of money;
receiving a skip command from the media device to skip the advertisement;
processing payment for the sum of money; and
suppressing the advertisement; and a secondary content generator:
generating secondary content; and
inserting the secondary content in the other ad space.

14. The method of claim 13, wherein the sum of money is calculated based on one or more of: the purchase price of the ad space, a profile of the viewer and popularity of the media content.

15. The method of claim 13, further comprising the steps of the secondary content generator:
determining a location of the ad space within the media content for which the advertisement is suppressed;
performing a semantic analysis of the media content; and
generating the secondary content based on the semantic analysis.

16. The method of claim 15, wherein the semantic analysis is based on one or more of: genre of the media content, mood of the media content and a profile of the viewer.

17. The method of claim 13, wherein the secondary content is generated using artificial intelligence.

* * * * *